United States Patent
Dunaway et al.

[11] Patent Number: 5,261,956
[45] Date of Patent: Nov. 16, 1993

[54] METHOD FOR IMPROVING THE RHEOLOGY OF CALCINED KAOLIN CLAY PRODUCTS

[75] Inventors: Weyman H. Dunaway, Sandersville; Paul R. Suitch, Milledgeville; David S. Bokor, Sandersville; Raymond B. McNeeley, Davisboro; Michael D. Smith; Tony May, both of Sandersville, all of Ga.

[73] Assignee: ECC International Inc., Atlanta, Ga.

[21] Appl. No.: 962,024

[22] Filed: Oct. 15, 1992

Related U.S. Application Data

[63] Continuation of Ser. No. 547,941, Jul. 3, 1990, abandoned.

[51] Int. Cl.$^5$ ............... C04B 14/10; C04B 33/04
[52] U.S. Cl. ................... 106/416; 106/484; 501/141; 501/150; 241/23; 241/24; 241/29
[58] Field of Search ........ 501/144, 150, 141; 106/416, 484, 486, 464, 468; 241/23, 24, 30, 19, 29, 184

[56] References Cited

U.S. PATENT DOCUMENTS

| | | | |
|---|---|---|---|
| 3,014,836 | 12/1961 | Proctor, Jr. | 106/484 |
| 3,326,705 | 6/1967 | Duke | 106/484 |
| 3,586,523 | 6/1971 | Fanselow et al. | 106/416 |
| 3,754,712 | 8/1973 | Cecil | 241/16 |
| 3,808,021 | 4/1974 | Maynard | 106/416 |
| 3,846,147 | 11/1974 | Tapper | 106/416 |
| 3,857,781 | 12/1974 | Maynard | 209/5 |
| 4,017,324 | 4/1977 | Eggers | 106/416 |
| 4,118,245 | 10/1978 | Hamill et al. | 106/416 |
| 4,118,246 | 10/1978 | Horzepa et al. | 106/416 |
| 4,144,084 | 3/1979 | Abercrombie, Jr. | 106/416 |
| 4,144,085 | 3/1979 | Abercrombie, Jr. | 106/416 |
| 4,334,985 | 6/1982 | Turner, Jr. | 209/5 |
| 4,381,948 | 5/1983 | McConnell et al. | 106/416 |
| 4,569,923 | 2/1986 | Knudson, Jr. et al. | 501/148 |
| 4,593,860 | 6/1986 | Cook et al. | 241/23 |
| 4,693,427 | 9/1987 | Bilimorin et al. | 241/23 |
| 4,820,554 | 4/1989 | Jones et al. | 427/391 |
| 4,826,536 | 5/1989 | Raythatha et al. | 106/465 |
| 5,028,268 | 7/1991 | Ince et al. | 106/416 |

OTHER PUBLICATIONS

"Perry's Chemical Engineers' Handbook", Sixth Edition, 1984 McGraw Hill, Inc. pp. 8–12.

Primary Examiner—Karl Group
Assistant Examiner—Michael A. Marcheschi
Attorney, Agent, or Firm—Klauber & Jackson

[57] ABSTRACT

A method for preparing a calcined kaolin clay powder having good high shear rheology in high solids aqueous slurries. A kaolin clay powder of fine particle size is calcined at a sufficient temperature and for a sufficient period to destroy the crystallinity thereof; and the calcined product is dry milled in a media mill, using a work input of from 100 to 160 hp-hr/ton of dry clay.

17 Claims, 6 Drawing Sheets

METHOD FOR IMPROVING THE RHEOLOGY OF CALCINED KAOLIN CLAY PRODUCTS

This application is a continuation of application Ser. No. 07/547,941, filed Jul. 3, 1990, now abandoned.

FIELD OF THE INVENTION

This invention relates generally to calcined clay products, and more specifically relates to a method for treating a substantially anhydrous white kaolin clay powder so as to improve the properties of same for use particularly as a pigment for paper and paperboard coating applications.

BACKGROUND OF THE INVENTION

In the course of manufacturing paper and similar products, including paper board and the like, it is well known to incorporate quantities of inorganic materials into the fibrous web in order to improve the quality of the resulting product. A number of inorganic materials have long been known to be effective for these purposes, such as titanium dioxide, which ca be incorporated into the paper in the form of anatase or rutile. Titanium dioxide, however, is among the most expensive materials which are so usable. Accordingly, in recent years, considerable efforts have been made to develop satisfactory replacements for the said titanium dioxide.

Among the materials which have thus found increasing acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. It is important for an understanding of the present invention, to recognize that those skilled in the art of kaolin processing draw a sharp and fundamental distinction between uncalcined and calcined kaolins. With respect to terminology, it is noted that the prior art literature, including numerous of the prior art patents relating to the field of kaolin products and processing, often uses the term "hydrous" to refer to a kaolin which has not been subjected to calcination—more specifically, which has not been heated to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O \cdot Al_2O_3 \cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. As used in this specification, the term "calcined kaolin" shall refer to such a kaolin. Preferably the calcined kaolin has been heated above the 980° C. exotherm, and therefore is "fully calcined", as opposed to having been rendered merely a "metakaolin". Reference may be had in the foregoing connection to Proctor. U.S. Pat. Nos. 3,014,836 and to Fanselow et al, 3,586,823, which disclosures are representative of portions of the prior art pertinent to fully calcined kaolins.

A calcined product having characteristics generally superior to previously available such calcined kaolin pigments, is the ALPHATEX® product of E.C.C. America Inc., assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high light-scatter and opacifying characteristics when incorporated as a filler in paper.

ALPHATEX® is further described in U.S. Pat. No. 4,381,948 to A.D. McConnell et al, as being an anhydrous white kaolin clay pigment having high light scattering when incorporated as a filler in paper, the pigment consisting of porous aggregates from sub-micron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that no more than 5% by weight thereof are greater than 10 microns ESD, at least 75% are of less than 2 microns ESD, and not more than 15% by weight are of less than 1 micron ESD. The pigment has a Valley abrasion value below 30 mg., and a G.E. brightness of at least 93.

Calcined kaolin clay products such as ALPHATEX® are normally pulverized in a high energy impact mill and air-classified after calcination for the purpose of removing +325 mesh residue (to conform to specification for intended use in paper), or in order to remove larger abrasive particles. In order to increase the bulk density and the wet-out characteristics of such products—thereby to facilitate bulk handling—it is disclosed in U.S. Pat. Nos. 4,593,860 and 4,693,427, that the anhydrous calcined kaolin clay powder can also be dry milled in a media mill, using work inputs of from about 5 to about 40 hp-hr/ton of dry clay.

Calcined kaolin clay products are often handled, shipped and/or utilized (e.g. when coating papers) as aqueous slurries, i.e., the calcined kaolin clay is slurried in water to form a slurry, e.g., of approximately 40% to 60% solids content, more or less. It is desired that the slurry not be unduly viscous since the more viscous the product generally the more difficult it is to handle and to use; but in the past this has proved to be a most vexatious problem, particularly wher the solids content of the slurry begins to exceed about 50%.

A large number of prior art patents are concerned with the general problem of reducing clay viscosity, such as Duke 3,326,705; Turner 4,334,985 and 4,468,317; Maynard 3,808,021 and 3,857,781; and Abercrombie. Jr. 4,144,084 and 4,144,085. These teachings, however, are applicable to hydrous clays, and commonly involve chemical control by additives or elimination of a species tending to cause viscosity problems. The prior art bearing upon viscosity control in calcined clay slurries is more limited, but often involves some type of milling or comminution of the calcined material.

According to Cecil. U.S. Pat. No. 3,754,712, for example, a fluid suspension or slurry of calcined kaolin clay is wet milled in the presence of grinding media, with incremental additions of calcined kaolin clay being added and wet milling continued until the viscosity of the slurry is reduced. Also of interest in this connection are Horzeoa et U.S. Pat. No. 4,118,246; and Hamill et al 4,118,245. The latter mentions the use of energy inputs of 200 hp-hr/ton; but both of these references concern wet milling, a procedure which is very difficult from an engineering viewpoint, requiring very complex and sophisticated controls. While more applicable to chemical stabilization of calcined clay slurries, reference may also be had to Tapper 3,846,147; and Eggers 4,017,324.

While the foregoing teachings are of value, it is desirable to be able to reduce the viscosity of slurries of calcined clay, without adding special chemical agents to the slurry, and without the use of the prolonged and complex processing inherent in the wet grinding methods of teachings such as Cecil, Hamill et al, Horzepa et al, etc.

Dry grinding of calcined kaolins, as mentioned, is taught in the present assignee's U.S. Pat.s Nos. 4,593,860 and 4,693,427. Also a broad teaching of frictionally working or milling a calcined kaolin to decrease its clay-water viscosity and adhesive demand, appears in Proctor. Jr., U.S. Pat. No. 3,014,836, where, however, wet milling is disclosed as the preferred and exemplified technique. None of this prior art, however, has disclosed how dry milling may be effectively utilized to produce a superior coating pigment.

More generally, calcined kaolin clay pigments such as the above described ALPHATEX ®, have been of increasing interest to paper manufacturers for use in paper coating. In common paper coating applications, the pigment properties sought often include high gloss, good printability, good opacity and high brightness. Where calcined kaolins are used, manufacturers would prefer to utilize a paper coating composition (the "coating color") which desirably incorporates from 15 to 20 parts pe hundred (by weight) of the calcined kaolin—this in place of more expensive pigments used in the past, such as titanium dioxide. Overall, the coating color in order to be most effective should include about 60 to 63% by weight of total solids. With prior art calcined pigments, all of these requirements could not be readily achieved. In particular, in order to achieve the mentioned parts of calcined kaolin in the 60 to 63% solids coating color, it is necessary to be able to use or handle the kaolin pigment at its equivalent of 60% solids; so that the overall requirement is that the kaolin pigment has good rheological properties as a 60% solids aqueous slurry—and also provide fully acceptable opacity, gloss, brightness, printability, etc. when coated. The prior art such pigments, while capable of being formed into such high solids slurries, tended to provide under such conditions very high dilitancy, and thus poor rheological properties. In an effort to allow the prior art calcined pigments to be used, lower solids can be employed, but this tends to leave excess water in the coating color—with resultant running during coating.

A further property of the prior art calcined pigments that has diminished the value of same as coating pigments, arises from the very porous highly aggregated nature of the component structures of same. While these properties foster high opacity, i.e., good light scattering, they have a detrimental effect on gloss when the pigment is used in coating.

OBJECTS OF THE INVENTION

Pursuant to the foregoing, it may be regarded as an object of the present invention, to provide a process for treating a calcined kaolin clay pigment, as to provide a product which is highly useful in paper coating applications.

It is a further object of the invention, to provide a process of the foregoing character, which may be readily carried out by us of comparatively simple equipment, and with relatively simple engineering requirements.

A still further object of the invention, is to provide a calcined kaolin coating pigment, which displays good rheology in very high solids aqueous slurries, thereby facilitating its use in coating and in the preparation of coating colors, and which provides high gloss, high brightness, and good opacity and printability characteristics in the papers upon which it is applied.

SUMMARY OF INVENTION

Now in accordance with the present invention, a method has been found for preparing a calcined kaolin clay pigment having excellent high shear rheology when formed into high solids aqueous slurries, thereby rendering said materials particularly useful in the coating of paper and paperboard products. At the same time, the resulting product provides high gloss, high brightness, and good opacity and printability in the papers to which it is applied. In accordance with the invention, a kaolin clay powder of fine particle size is calcined at a sufficient temperature and for a sufficient period to destroy the crystallinity of same and render the powder substantially amorphous. The resulting calcined product is then dry milled in a media mill using a work input of from about 100 to 160 hp-hr/ton of dry clay. The product from the dry milling is preferably then pulverized to eliminate undesirable larger particles, usually particles of over 325 mesh. The work input during the pulverization step is preferably at least 30 hp-hr/ton of dry clay, and preferably 50 to 75 hp-hr/ton of dry clay.

The product from the foregoing process comprises porous aggregates of anhydrous kaolin clay particles, at least 50% by weight of the aggregates being of less than 0.5 micrometer equivalent spherical diameter (ESD). The pigment has a normalized scatter of less than 640 and a porosity of less than 0.90 cm$^3$/g.

The dry milling step of the invention is preferably carried out in a horizontal (ball) mill, such as the mill of this type available commercially from the Pattersen Equipment Company. The pulverizing following milling may be effected in such devices as the well-known Hurricane ® mill, which is a product of C.E. Bauer Co. of Chicago, Ill., the said device being a high energy impact mill.

The media utilized in the horizontal media mills preferably comprise small ceramic balls, preferably of alumina. The size of the media is not completely critical. In general, spherical media from ¼" to 2" in diameter may be readily employed in the present invention—as may media of other shapes, such as ellipsoids, rods, cylinders and the like. Where spherical media are used, a more typical size range is about 1 to 2 inches diameter.

As will become apparent in the ensuing detailed description, the use of the high energy horizontal dry media milling effects reduction among the long chain aggregates which typically are found in products such as the aforementioned ALPHATEX ®. The resulting product is found to display reduced porosity and reduced light scatter as compared to products like ALPHATEX ®, but these properties are not impaired to a degree as to adversely affect the coating properties of a coating composition formed from or including the product of the invention. However, the brightness characteristics of the calcined material are fully retained, and importantly, the glossing characteristics are materially increased by the process of the invention. Also importantly, the viscosity characteristics, specifically the high shear rheology, are improved, i.e., the fluidity of high solids aqueous suspensions incorporating the new materials are significantly better than suspensions of prior art calcined pigments such as ALPHATEX ®, thereby enabling coating of paper or paperboard products to be achieved with a new degree of efficiency. In particular, such aspects as runability of a coating color are found to be improved when prepared using the products of the invention.

The improvements in viscosity characteristics result in reduced dilatantcy, which also means that high solids aqueous suspensions of the said pigments, including typically up to 60%, and to even as high as 64% solids may be easily handled and shipped, and thus readily transferred from a shipping container to the point of use without the difficulties which have been encountered with high solids slurries of prior art calcined pigments.

DETAILED DESCRIPTION OF THE PREFERRED EMBODIMENTS

Figure 1:
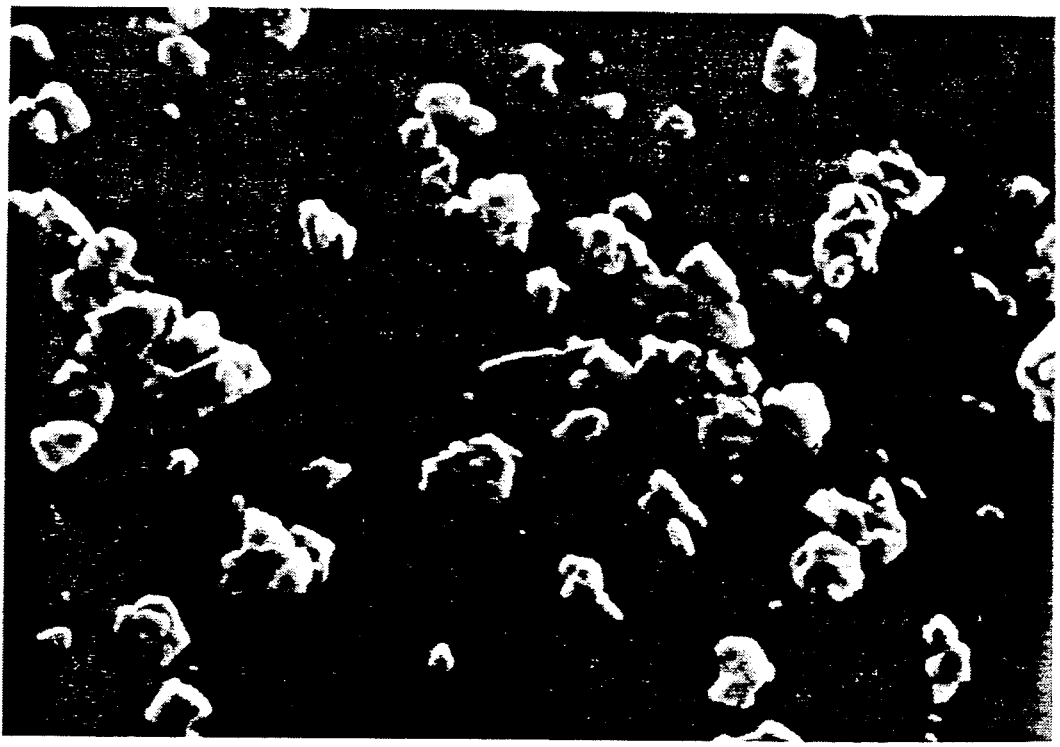
FIG. 1 is an electron photomicrograph of a dry ball milled product in accordance with the invention.

The calcined clay powder to be dry milled in accordance with this invention can, for example, be that described in U.S. Patent No. 4,381,948. The said McConnell et al U.S. Pat. No. 4,381,948 is incorporated herein by reference. The calcined kaolin clay may have been pulverized following the calcination step as described in McConnell et al. but this step is optional. It is preferable in the present invention to utilize, as in McConnell (and in Fanselow 3,586,823), a feed to the calciner which is very fine, preferably one having a PSD showing greater than 80% < ½ micrometer, and typically being 88 to 91 < ½ micrometer.

The calcined kaolin clay powder to be subjected to the invention is then provided to the media mill, which preferably is of the horizontal mill type as previously indicated. While various ceramic media may be utilized in the mill, including media formed of such materials as zirconia and the like, a preferable material for the media comprises alumina balls, typically in the size range of from about 1 to 2 and preferably from about 1¼ inch to 1½ inch. Mixtures of the various sizes may also be used. Energy input during the dry milling should generally be in the range of from about 100 to 160 hp-hr/ton of dry clay, and more preferably in the range of from 110 to 120 hp-hr/ton. It may be noted that in the prior art use of dry milling set forth in the aforementioned U.S. Pat. No. 4,593,860 to Cook et al and U.S. Patent No. 4,693,427 to Bilimoria et al. substantially less energy input is used. Indeed, in the preferred mode of the present invention, from about 4 to 6 times the energy input is utilized than was previously taught by the said patents. Here to be noted is that the prior art Cook et al and Bilimoria et al patents are not directed to the objectives achieved by the present invention; i.e., in those prior art instances, it is the dry bulk handling characteristics such as flowability of the materials which are of interest. In the present instance, the invention as has been indicated, is directed toward achieving characteristics which will provide superior characteristics for coating applications, including reduced dilatantcy when prepared as a high solids slurry, glossing characteristics and the like. In such connection, it has been found critical to utilize a work input within the range set forth, in that when the work input is below the range indicated, there is inadequate improvement in the viscosity characteristics of high solid slurries, and neither are the glossing characteristics substantially improved. At the same time while glossing can be improved by utilizing energy levels above the range set forth, when such higher energies are utilized, the aggregate structures begin to be so severely impaired that porosity and thus light scattering characteristics are adversely affected to a point where the important characteristic of opacity is impaired. This means that a coatin provided with such low opacity materials will be an inadequate coating, in turn requiring that higher proportions of the pigment may be necessary to achieve an adequate appearance in the surface characteristics and in the printability of the coated paper.

The invention will now be illustrated by specific Examples, which should, however, be considered exemplary only of the invention, and not delimitative of the characteristics otherwise set forth.

EXAMPLE 1

In this and the remaining Examples of this specification, the substantially anhydrous calcined kaolin clay powder subjected to the process of the invention (i.e. used as a feed), was the unmodified calciner product which would normally be lightly milled and pulverized to produce the ALPHATEX ® product previously described. This feed will be referred to herein as "unmodified ALPHATEX ® precursor" "pre-ALPHATEX ®". In this Example, a sample of the said pre-ALPHATEX ® was subjected to dry ball milling in a horizontal ball mill generally of the type described in the aforementioned Bilimoria U.S. Pat. No. 4,693,427. The media used more specifically, however, comprised 1¼" diameter alumina balls. The residence time in the mill was such that the energy dissipated was approximately 110 hp-hr/ton of dry clay. This procedure was followed by a milling in a high energy impact mill, specifically the aforementioned Hurricane ® mill of C. E. Bauer Co., with the amount of energy being dissipated in the latter mill being 50 to 75 hp-hr/ton. The resulting product was then formed into a high solids (i.e. 60% solids) calcined aqueous slurry, and it was found that the slurry had good high shear rheology (790 rpm at 18 dynes). Paper coating evaluations indicated that the improved high shear rheology of this slurry drastically improved the runability (coatability) of same, and allowed for the incorporation of more of the calcined kaolin product in coating colors.

The brightness of the product of this Example was found to be 92.3 on the G.E. scale utilizing TAPPI procedure T-646-os-75. +325 mesh residue was 0.00471. The P.S.D. (particle size distribution) of the product was such that 99% by weight of the particles were <10 micrometers; 91%<2 micrometers; 84%<1 micrometers; 56%<½ micrometers. This should be compared to the P.S.D. of the input product, i.e. the feed pre-ALPHATEX®, which was as follows: 87%<2; 74%<1; 16%<½; and 2%<¼ micrometers.

The TAPPI viscosity was evaluated as 60 cps at 20 rpm for 60% solids, and 20 cps at 20 rpm for 50% solids. The Hercules viscosity was 18 dynes at 790 rpm at 60% solids; 4 dynes at 4400 rpm at 50% solids.

Breunig abrasion was 47.7, such abrasion being determined by the procedure described at Table II of U.S. Pat. No. 4,678,517, assigned to the present assignee. This can be compared to the abrasion of the input feed pre-ALPHATEX®, which was 48.

EXAMPLE 2

Figure 3:
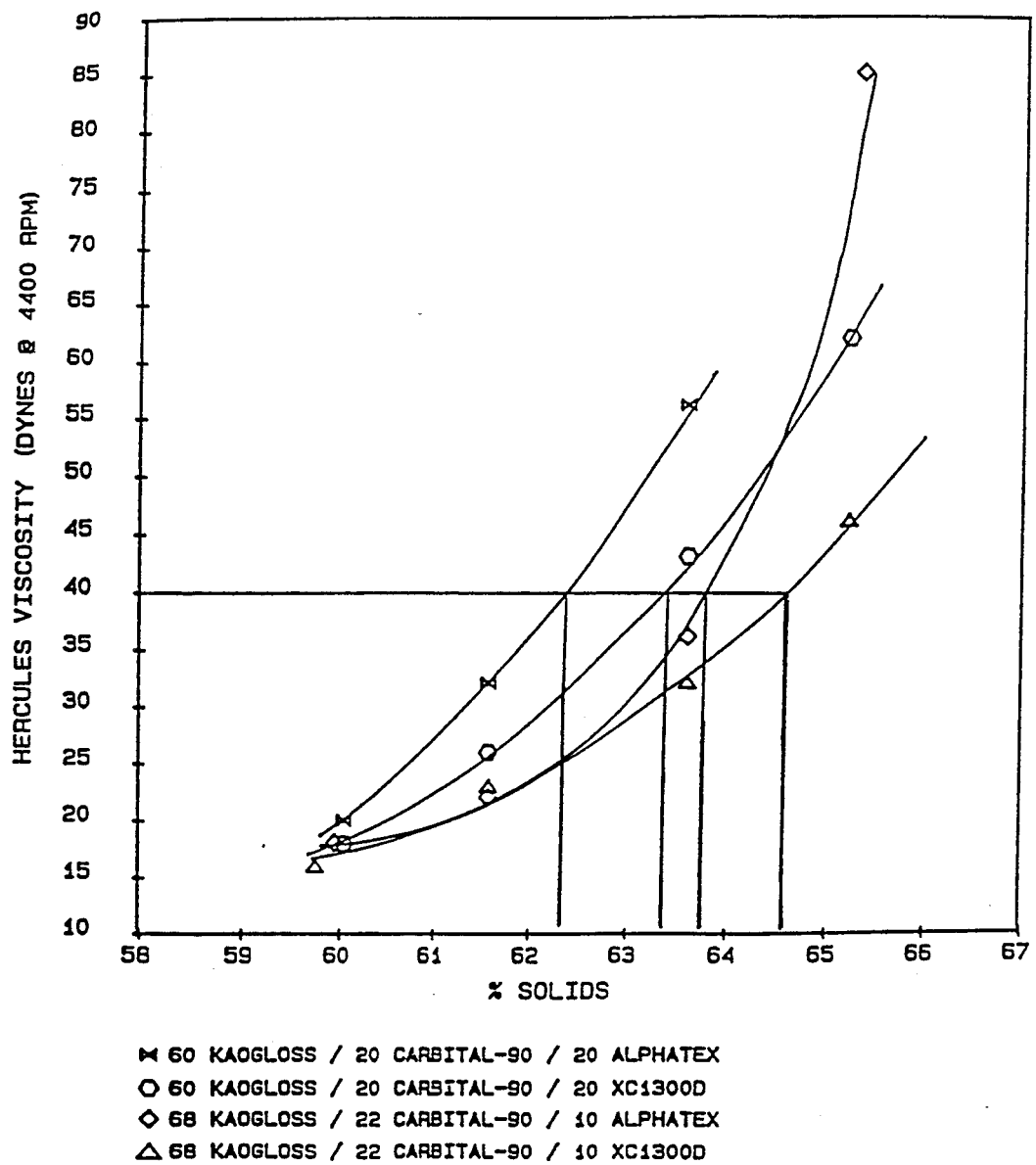
FIG. 3 is a graph of Hercules viscosity vs. percentage solids for several coating colors incorporating the product of the invention or control prior art products.
Figure 4:
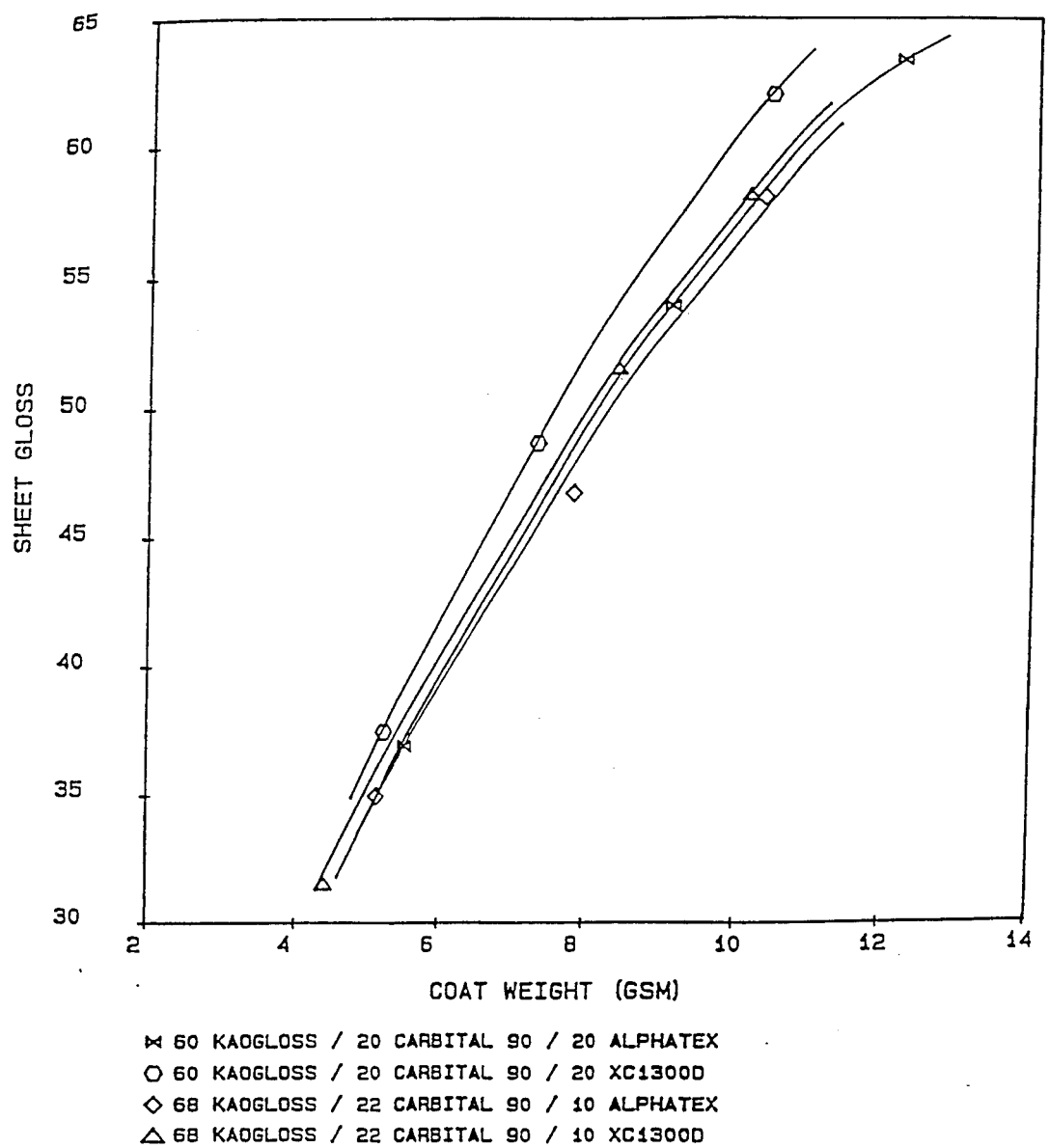
FIG. 4 is a graph showing sheet gloss as a function of coating weight for several coating colors incorporating the product of the invention o control prior art products.
Figure 5:
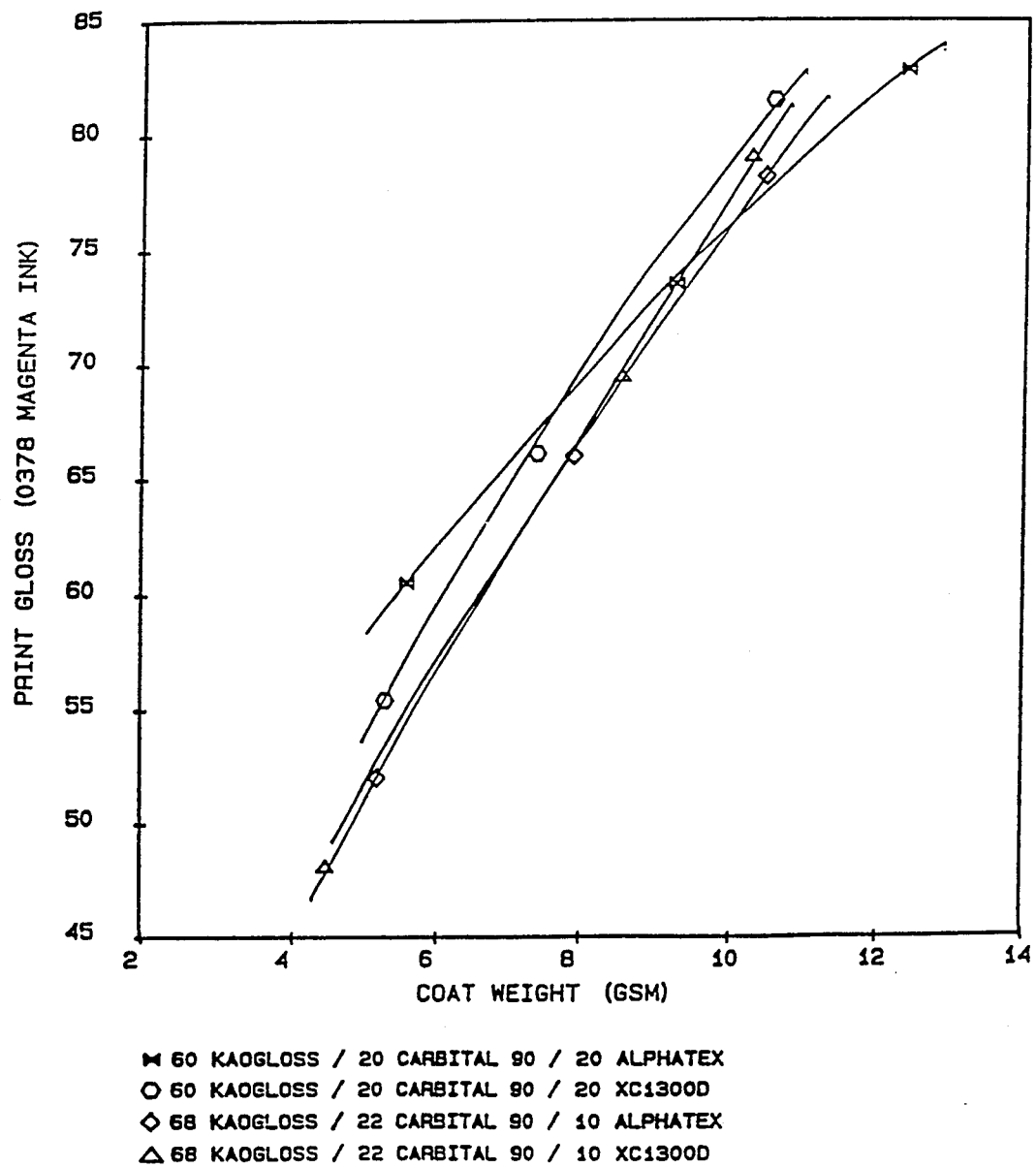
FIG. 5 is a graph showing print gloss achieved with coating colors incorporating the product of the invention or control prior art products.
Figure 6:
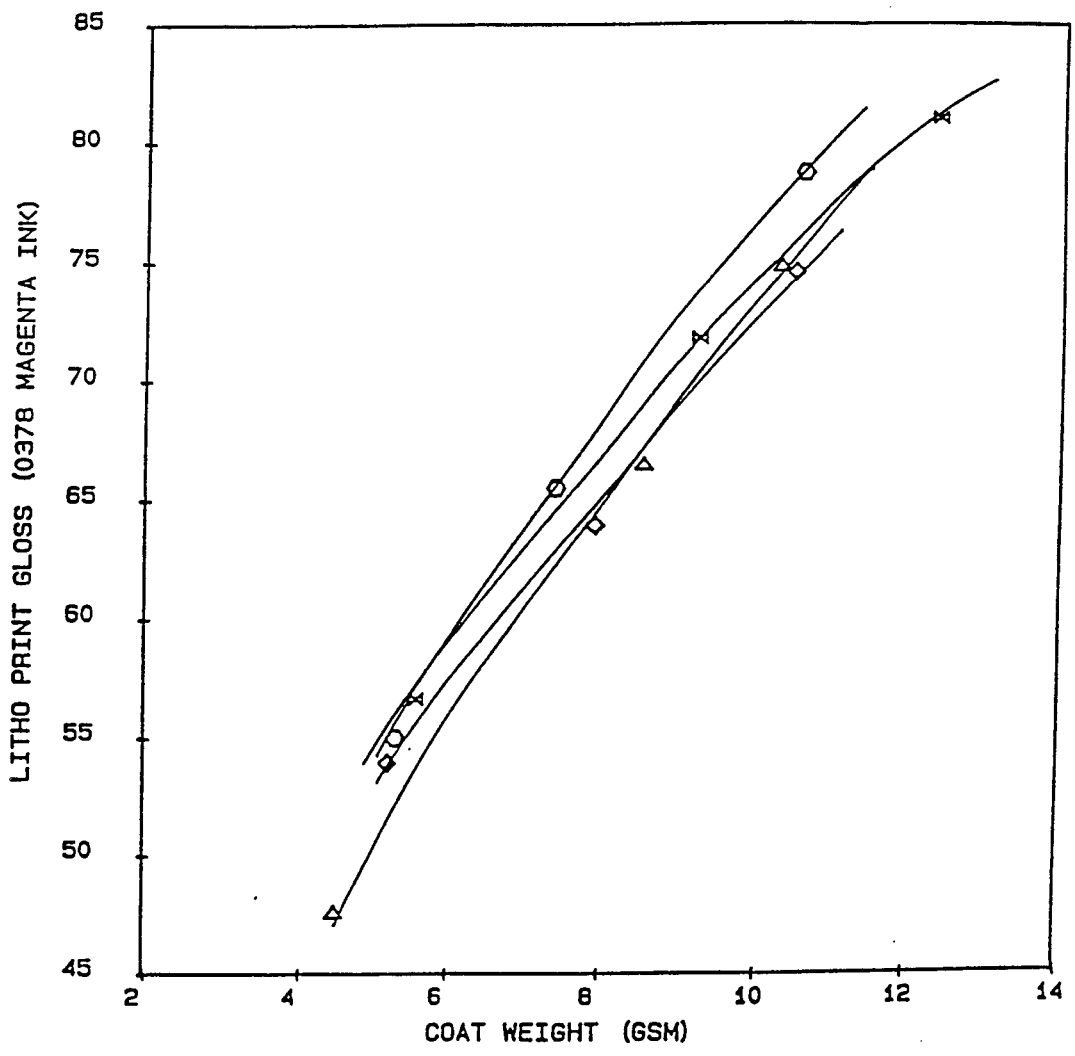
FIG. 6 is a graph showing litho print gloss achieved with coating colors incorporating the product of the invention or control prior art products.

The coating characteristics of a further product sample, prepared as in Example 1, were evaluated in a series of paper coating uses. More specifically, the product of the invention was compared with a conventional calcined kaolin clay pigment, i.e. the aforementioned ALPHATEX® in coating applications where 10 and 20 parts by weight were used in the coating color. The results of the testing are set forth in FIGS. 3 through 6. More specifically, in FIG. 3, the Hercules viscosity is shown as a function of percentage solids in coating colors, for four different formulations. In each instance, 60% or 68% of the total solids constituted KAO-GLOSS, a conventional fine particle size glossing pigment, available from J. M. Huber Corporation. 20% constituted a fine particle size ground calcium carbonate, i.e., the CARBITAL 90 product (90% <2 micrometers) of Atlantic Carbonates, Inc. (Baltimore, Md.), and 10% or 20% constituted either the aforementioned ALPHATEX® or the product of the invention. The sheet gloss of similar compositions is shown in FIG. 4; print gloss (as a function of coat weight) in FIG. 5; and litho print gloss (as a function of coat weight) in FIG. 6. From these showings, it will be evident that significant Hercules viscosity advantages are yielded at the 20 part addition level for the product of the invention, which allows for higher coating color solids to be attained with the said product. Sheet gloss improvements are seen with the product of the invention at both addition levels, with overall benefits being obtained with increasing addition of the said product. Furthermore, it will be seen that little difference occurs in printability between the product of the invention and the ALPHATEX® control for either addition level.

Little or no brightness or opacity changes were noted between the ALPHATEX® control and the product of the invention, although small differences were noted as between addition levels. An analysis of the data indicates that in the present coating application, at an arbitrary 40 dynes at 4400 rpm Hercules viscosity, 20 parts of conventional ALPHATEX® could be used at 62+% solids; 20 parts of the product of the invention at 63+% solids 0 parts of conventional ALPHATEX® at 64%; or 10 parts of the product of the invention at 64.5%. Of interest is that there is little difference in viscosity effects as between 10 parts of ALPHATEX® and 20 parts of the product of the invention at 40 dynes. The ability to use increased amounts of the product of the invention (as compared to the prior art products) enables higher paper porosity while maintaining the same viscosity in the coating color. For example, in one test of sheet porosity via the Gurely porosity test, the incorporation of 20 parts of the product of the invention gave a porosity of 13.4 ml/min, compared to 12 ml/min for 10 parts of ALPHATEX® in the coating color. The Hercules viscosity of the two colors were comparable. Perhaps more importantly the 10 parts ALPHATEX® percent solids versus Hercules viscosity, steepens sharply at 64% to 65% solids. Given the titania dioxide replacement capabilities of conventional calcined clays such as ALPHATEX®, the product of the invention thus provides significant improvements at low weight coating uses, either in terms of enabling higher addition levels or enhanced runability.

EXAMPLE

Figure 2:
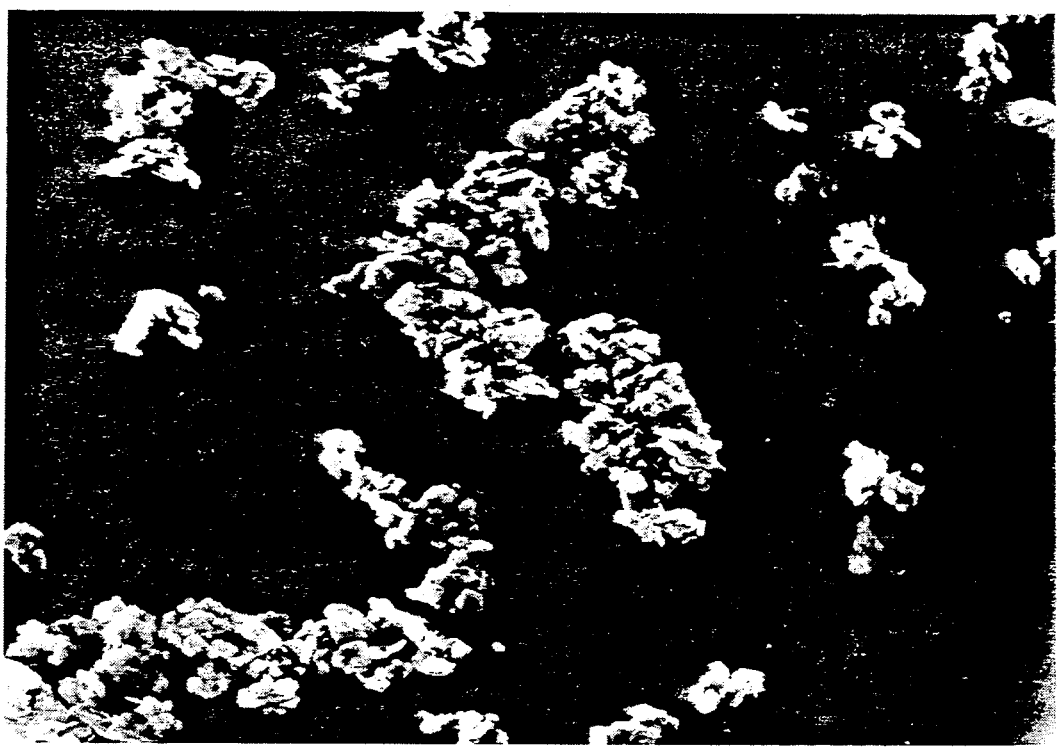
FIG. 2 is an electron photomicrograph of a sample of a conventional, commercial calcined clay product.

The product of the invention as prepared in accordance with Examples 1 and 2, was examined under an electron microscope, with results being shown in FIG. 1, which may be compared with the conventional calcined kaolin clay ALPHATEX® shown in FIG. 2. The improvement in the rheology and percentage solids of a calcined slurry which may be effectively used, is believed due to the reduction in the dilatancy of the calcined clay slurry, which is effected by the invention's reduction of the intra-aggregate pore volume of the calcined clay material, from approximately 1.10 cm$^3$/g to about 0.86 cm$^3$/g. This effect may be seen clearly from Table 1 below, which sets forth the effects of the present dry milling on the physical properties on the product of the invention. Specifically, the product of the invention is compared in Table 1 with conventionally processed ALPHATEX®, with respect to normalized light scatter, pore volume, particle size distribution for the <½ micron fraction, high shear rheology and wetout rate. The "normalized light scatter" testing procedures are set forth in U.S. Pat. No. 4,820,554, assigned to the present assignee. The "wetout rate" is discussed in the aforementioned U.S. Pat. Nos. 4,593,860 and 4,693,427. It will be apparent from the FIGS. 1 and 2 that the reduction in porosity is caused by the fracturing of the long chain calcined clay aggregates to form individual calcined clay aggregates of reduced size as seen in the photograph, and the generation of fines in the particle size distribution as seen in Table 1. However, it is important to note that the scatter, while being reduced, has not been markedly affected. At the same time, the change in particle size distribution is significant in improving the gloss.

TABLE 1
The Effect of Horizontal Milling on the Physical Properties of Calcined Clay

| Sample | Degree of Horizontal Milling | Scatter | Pore Volume (cm³/g) | PSD at ½ m | High Shear × Rheology (cps)* | Wetout Rate (sec.) |
| --- | --- | --- | --- | --- | --- | --- |
| Pre-ALPHATEX ® | 0 | 707 | 1.26 | 10 | 1290 | 192 |
| Typical ALPHATEX ® | Normal ALPHATEX ® Procedure | 681 | 1.10 | 24 | 560 | 38 |
| Product of Invention | 4 × of Normal ALPHATEX ® Procedures | 638 | 0.86 | 56 | 17 | 29 |

*cps at 4400 rpms and 50% solids

While the present invention has been particularly set forth in terms of specific embodiments thereof, it will be understood in view of the instant disclosure, that numerous variations upon the invention are now enabled to those skilled in the art, which variations yet reside wtihin the scope of the present teaching. Accordingly, the invention is to be broadly construed, and limited only by the scope and spirit of the claims now appended hereto.

We claim:

1. A method for preparing a calcined kaolin clay powder having good high shear rheology in high solids aqueous slurries, thereby facilitating its use in coating and in the preparation of coating colors, and which provides high gloss, high brightness, and good opacity and printability characteristics in the papers upon which it is applied; said method comprising:
    (a) calcining a kaolin clay powder of fine particle size at a sufficient temperature and for a sufficient period to destroy the crystallinity thereof; ad
    (b) dry milling the calcined product from step (a) in a media mill, using a workk input of from 100 to 160 hp-hr/ton of dry clay.

2. A method in accordance with claim 1, wherein the product from step (b) is pulverized to eliminate undesirable larger particles.

3. A method in accordance with claim 1, wherein said work input in step (b) is in the range of from 110 to 120 hp-hr/ton of dry clay.

4. A method in accordance with claim 2, wherein the work input during said pulverization step is at least 30 hp-hr/ton of dry clay.

5. A method in accordance with claim 3, wherein the work input during said pulverization step is from 50 to 75 hp-hr/ton of dry clay.

6. A method in accordance with claim 1, wherein said step (b) is carried out utilizing spherical media in a horizonta mill.

7. A method in accordance with claim 6, wherein said media comprises ceramic balls of from 1 to 2 inches diameter.

8. A method for preparing a high solids aqueous slurry of a calcined kaolin clay coating pigment having improved fluidity, thereby facilitating its use in coating and in teh preparation of coating colors, and the said pigment of which provides high gloss, high brightness, and good opacity and printability characteristics in the papers upon which it is applied; said method comprising the steps of:
    (a) calcining a beneficiated kaolin clay powder at sufficient temperatures and for a sufficient period to destroy the crystallinity thereof and provide an amorphous calcined kaolin powder;
    (b) dry milling the calcined product from step (a) in a media mill using a work input of from 100 to 160 hp-hr/ton of dry clay; and
    (c) forming a 50% to 60% by weight solids aqueous slurry of the calcined product from step (b).

9. A method in accordance with claim 8, wherein following step (b) and preceding step (c), the calcined and milled produc is pulverized to eliminate undesirable larger particles.

10. A calcined amorphous kaolin coating pigment comprising porous aggregates of anhydrous kaolin clay particles, said pigment having been dry media milled in its amorphous state using a work input of from 100 to 160 hp-hr/ton of dry kaolin.

11. A pigment in accordance with claim 10, in which at least 50% by weight of the aggregates are of less than 0.5 μm ESD, said pigment having a normalized scatter of less than 640, and a porosity of less than 0.90 cm³/g.

12. In the method for preparing a calcined kaolin clay powder for use ni paper coating, by the steps of calcining a beneficiated kaolin powder to destroy the crystallinity thereof and provide an amorphous calcined kaolin powder; and dry milling the said amorphous calcined powder in a media mill;
    the improvement which enables fractring a long chain kaolin clay aggregates to form individual calcined clay aggregates of reduced size, thereby reducing the dilatancy of high slids aqueous slurries ormed from the kaolin, while not impairing the porosity and light scattering characteristics of the aggregates to a point where the opacity of paper coatings formed from the kaolin is impaired; comprising:
    effecting siad dry milling of siad amorphous calcined powder using a work input in the range of from 100 to 160 hp-hr/ton of dry clay.

13. The method of claim 12 wherein the dry milled product is pulverized to eliminate undesirale larger particles.

14. The method of claim 12, wherein said work input is in the range of from 110 to 120 hp-hr/ton of dry clay.

15. The method of claim 13, wherein the work input during said pulverization step is from 50 to 75 hp-hr/ton of dry clay.

16. A coating color for coating paper, which provides high gloss, high brightness, and good opacity and printabilit characteristics in the papers upon which it is applied; comprising:
    a calcined beneficiated kaolin clay powder which has been dry milled ina media mill using a work input of from 100 to 160 hp-hr/ton of dry clay.

17. The method of claim 16 wherein the dry milled product is pulverized to eliminate undesirable larger particles.

* * * * *

UNITED STATES PATENT AND TRADEMARK OFFICE
CERTIFICATE OF CORRECTION

PATENT NO. : 5,261,956

DATED : November 16, 1993

INVENTOR(S) : W.H. Dunaway et al.

It is certified that error appears in the above-identified patent and that said Letters Patent is hereby corrected as shown below:

Column 1, line 23 "ca" should read "can".

Column 5, line 43, "o" should read "or".

Column 6, line 39, "coatin" should read "coating".

Column 9, line 38, "workk" should read "work".

Column 9, line 54, "horizonta" should read "horizontal".

Column 9, line 61, "teh" should read "the".

Column 10, line 22, "produc" should read "product".

Column 10, line 34, "ni" should read "in".

Column 10, line 39, "fractring" should read "fracturing".

Column 10, line 42, "slids" should read "solids".

Column 10, line 43, "ormed" should read "formed".

Column 10, line 48, "siad" should read "said".

UNITED STATES PATENT AND TRADEMARK OFFICE
CERTIFICATE OF CORRECTION

PATENT NO. : 5,261,956
DATED : November 16, 1993
INVENTOR(S) : W.H. Dunaway et al.

It is certified that error appears in the above-identified patent and that said Letters Patent is hereby corrected as shown below:

Column 10, line 60, "tablit" should read "tability"

Column 10, line 64, "ina" should read "in a".

Signed and Sealed this

Seventh Day of February, 1995

Attest:

BRUCE LEHMAN

Attesting Officer     Commissioner of Patents and Trademarks